United States Patent
Man et al.

(10) Patent No.: US 10,230,486 B2
(45) Date of Patent: Mar. 12, 2019

(54) OPTICAL TRANSCEIVER WITH COMMON END MODULE

(71) Applicant: Huawei Technologies Co., Ltd., Shenzhen (CN)

(72) Inventors: Jiangwei Man, Wuhan (CN); Xiaolu Song, Shenzhen (CN); Li Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/783,382

(22) Filed: Oct. 13, 2017

(65) Prior Publication Data
US 2018/0054273 A1   Feb. 22, 2018

Related U.S. Application Data

(63) Continuation of application No. PCT/CN2015/076665, filed on Apr. 15, 2015.

(51) Int. Cl.
*H04J 14/02* (2006.01)
*H04Q 11/00* (2006.01)
(Continued)

(52) U.S. Cl.
CPC .......... *H04J 14/0247* (2013.01); *H04B 10/40* (2013.01); *H04B 10/506* (2013.01);
(Continued)

(58) Field of Classification Search
CPC ............. H04J 14/0247; H04Q 11/0005; H04Q 11/0083; H04Q 2011/0016
See application file for complete search history.

(56) References Cited

U.S. PATENT DOCUMENTS 8,320,761 B2 * 11/2012 Zheng ................. G02B 6/2804
385/27
8,625,991 B1 *  1/2014 Sindhu ............... H04Q 11/0071
372/29.01
(Continued)

FOREIGN PATENT DOCUMENTS

CN          1980098 A      6/2007
CN        102136867 A      7/2011
(Continued)

OTHER PUBLICATIONS

Machine Translation and Abstract of Chinese Publication No. CN1980098, Jun. 13, 2007, 10 pages.
(Continued)

*Primary Examiner* — Akm E Ullah
(74) *Attorney, Agent, or Firm* — Conley Rose, P.C.

(57) ABSTRACT

An optical transceiver and a network device are provided. The optical transceiver includes a common end module and two data submodules. The common end module includes a multi-carrier light source, a wavelength division multiplexer, a wavelength division demultiplexer, an external optical interface, and two first beam splitters. Each data submodule includes a second beam splitter, an optical/electrical signal modulator, and an optical receiver. According to the optical transceiver and the network device, a high-capacity optical transceiver with a single optical interface can be implemented, so that optical interface management complexity is reduced, and a fiber resource is reduced.

14 Claims, 5 Drawing Sheets

(51) Int. Cl.
*H04B 10/40* (2013.01)
*H04B 10/50* (2013.01)

(52) U.S. Cl.
CPC .......... *H04J 14/02* (2013.01); *H04Q 11/0005* (2013.01); *H04Q 2011/0016* (2013.01); *H04Q 2011/0022* (2013.01); *H04Q 2011/0083* (2013.01)

(56) References Cited

U.S. PATENT DOCUMENTS

| | | | |
|---|---|---|---|
| 2004/0151497 | A1 | 8/2004 | Lee et al. |
| 2004/0208614 | A1* | 10/2004 | Price ................ H04B 10/505 398/152 |
| 2009/0214221 | A1* | 8/2009 | Li ...................... H04B 10/40 398/136 |
| 2015/0207563 | A1* | 7/2015 | Cho .................... H04J 14/02 398/79 |
| 2016/0134375 | A1* | 5/2016 | Kakande ............ H04B 10/43 398/135 |

FOREIGN PATENT DOCUMENTS

| CN | 102714551 | A | 10/2012 |
|---|---|---|---|
| CN | 103229433 | A | 7/2013 |
| CN | 103650388 | A | 3/2014 |
| CN | 103888192 | A | 6/2014 |
| CN | 203632822 | U | 6/2014 |

OTHER PUBLICATIONS

Machine Translation and Abstract of Chinese Publication No. CN102136867, Jul. 27, 2011, 10 pages.
Machine Translation and Abstract of Chinese Publication No. CN102714551, Oct. 3, 2012, 16 pages.
Machine Translation and Abstract of Chinese Publication No. CN103229433, Jul. 31, 2013, 15 pages.
Machine Translation and Abstract of Chinese Publication No. CN103650388, Mar. 19, 2014, 8 pages.
Machine Translation and Abstract of Chinese Publication No. CN203632822, Jun. 4, 2014, 8 pages.
Foreign Communication From a Counterpart Application, PCT Application No. PCT/CN2015/076665, English Translation of International Search Report dated Jan. 18, 2016, 3 pages.
Machine Translation and Abstract of Chinese Publication No. CN103888192, Jun. 25, 2014, 11 pages.
Foreign Communication From a Counterpart Application, Chinese Application No. 201580077416.6, Chinese Office Action dated Jun. 26, 2018, 7 pages.

* cited by examiner

OPTICAL TRANSCEIVER WITH COMMON END MODULE

CROSS-REFERENCE TO RELATED APPLICATIONS

This application is a continuation of International Application No. PCT/CN2015/076665, filed on Apr. 15, 2015, which is hereby incorporated by reference in its entirety.

TECHNICAL FIELD

The present disclosure relates to the field of optical communications, and in particular, to an optical transceiver and a network device.

BACKGROUND

An optical transceiver is a carrier used for signal transmission between a router and a network device, and mainly implements a conversion between an optical signal and an electrical signal. As a capacity of the network device increases, a processing rate of the router and a capacity of a single cable clip will rapidly increase to 1 Terabit per second (Tbps), 2 Tbps, or even 4 Tbps in a few years, and a high-capacity optical transceiver also needs to be configured for the router to implement optical interconnection. Therefore, implementation of the high-capacity optical transceiver is a current technology development direction.

Currently, there are two main methods for resolving a high-capacity optical transceiver problem. One is using a large-granularity pluggable optical transceiver, and the other is multiplexing multiple small-granularity optical transceivers. A large granularity means that an optical transceiver has a relatively high capacity, such as 1 Tbps. A small granularity means that an optical transceiver has a relatively small capacity, such as 40 Gigabits per second (Gbps).

However, costs of using a large-granularity pluggable optical transceiver to implement a high-capacity optical transceiver are greatly higher than costs of multiplexing multiple small-granularity optical transceivers. In addition, a demand for a large-granularity pluggable optical transceiver is limited to signal transmission only between an Optical Transmission Network (OTN) and a core router, and only a limited quantity is demanded. Little usage leads to a lack of motivation to reduce costs of a large-granularity pluggable optical transceiver. Moreover, it takes a relatively long time to develop a large-granularity pluggable optical transceiver, and consequently, a cable clip update requirement cannot be met. If a high-capacity transceiver is implemented by multiplexing multiple small-granularity optical transceivers, a router needs to manage and configure multiple optical interfaces, and this increases optical interface management complexity. In addition, because each optical interface and a peer network device need to be interconnected using a fiber corresponding to the optical interface, a fiber resource for point-to-point interconnection is wasted.

SUMMARY

The present disclosure provides an optical transceiver and a network device, so that a high-capacity optical transceiver with a single optical interface can be implemented based on small-granularity optical transceivers, and the single optical interface is managed, thereby reducing optical interface management complexity, and reducing a fiber resource.

According to a first aspect of the present disclosure, an optical transceiver is provided, including a common end module and two data submodules, where the common end module includes a multi-carrier light source, a wavelength division multiplexer, a wavelength division demultiplexer, an external optical interface, and two first beam splitters; the data submodule includes a second beam splitter, an optical/electrical signal modulator, and an optical receiver; the multi-carrier light source is separately connected to first ports of the two first beam splitters, the wavelength division multiplexer is separately connected to second ports of the two first beam splitters, a third port of each first beam splitter is connected to a first port of the second beam splitter in the data submodule, and the wavelength division demultiplexer is connected to the optical receiver in each data submodule; in each data submodule, a second port of the second beam splitter is connected to an input port of the optical/electrical signal modulator, and a third port of the second beam splitter is connected to an output port of the optical/electrical signal modulator; the multi-carrier light source is configured to generate optical signals of two wavelengths, and each of the optical signals of two wavelengths is input to the second beam splitter in the data submodule using the first beam splitter, and the optical/electrical signal modulator is configured to modulate a to-be-output electrical signal and an optical signal in the second beam splitter to to-be-output optical signals, where the to-be-output optical signals are input to the wavelength division multiplexer using the second beam splitter, to be combined into a to-be-sent optical signal, and the to-be-sent optical signal is output using the external optical interface; and an optical signal received by the external optical interface is split into two to-be-received optical signals using the wavelength division demultiplexer, each to-be-received optical signal is input to the optical receiver in the data submodule, and the optical receiver in each data submodule is configured to perform optical/electrical detection on a received to-be-received optical signal, to output a to-be-received electrical signal.

With reference to the first aspect, in a first possible implementation of the first aspect, the optical transceiver includes at least two data submodules; the common end module includes at least two first beam splitters; a quantity of the first beam splitters is greater than or equal to a quantity of the data submodules; the multi-carrier light source is separately connected to first ports of the at least two first beam splitters, the wavelength division multiplexer is separately connected to second ports of the at least two first beam splitters, a third port of each first beam splitter is connected to a first port of the second beam splitter in the data submodule, and the wavelength division demultiplexer is connected to the optical receiver in each data submodule; the multi-carrier light source is configured to generate optical signals of at least two wavelengths, and each of the optical signals of at least two wavelengths is input to the second beam splitter in the data submodule using the first beam splitter, and the optical/electrical signal modulator is configured to modulate a to-be-output electrical signal and an optical signal in the second beam splitter to to-be-output optical signals, where the to-be-output optical signals are input to the wavelength division multiplexer using the second beam splitter, to be combined into a to-be-sent optical signal, and the to-be-sent optical signal is output using the external optical interface; and an optical signal received by the external optical interface is split into at least two to-be-received optical signals using the wavelength division demultiplexer, each to-be-received optical signal is input to the optical receiver in the data submodule, and the optical receiver in each data submodule is configured to perform optical/electrical detection on a received to-be-received optical signal, to output a to-be-received electrical signal.

With reference to the first possible implementation of the first aspect, in a second possible implementation of the first aspect, the first beam splitter and the second beam splitter are polarization beam splitters, the multi-carrier light source is configured to generate linearly polarized light of at least two wavelengths, and the first beam splitter and the second beam splitter are connected using a polarization maintaining optical fiber.

With reference to the second possible implementation of the first aspect, in a third possible implementation of the first aspect, the polarization beam splitter is a bidirectional multiplex polarization beam splitter.

With reference to any one of the first aspect to the third possible implementation of the first aspect, in a fourth possible implementation of the first aspect, the optical/electrical signal modulator includes a Mach-Zehnder modulator or an electro-absorption modulator.

With reference to any one of the first aspect to the third possible implementation of the first aspect, in a fifth possible implementation of the first aspect, the external optical interface is a single optical interface.

With reference to any one of the first aspect to the third possible implementation of the first aspect, in a sixth possible implementation of the first aspect, the optical transceiver further includes an internal optical interface, and the internal optical interface is multiple optical interfaces; and the third port of each first beam splitter is connected to the first port of the second beam splitter in the data submodule using the internal optical interface.

With reference to any one of the first aspect to the third possible implementation of the first aspect, in a seventh possible implementation of the first aspect, the optical transceiver further includes an optical interface and electrical interface connector, the optical interface and electrical interface connector includes at least two internal optical interfaces, a quantity of internal optical interfaces inside the optical interface and electrical interface connector is equal to the quantity of the first beam splitters, and each internal optical interface of the optical interface and electrical interface connector has a corresponding to-be-output electrical signal interface and a corresponding to-be-received electrical signal interface; the third port of each first beam splitter is connected to the first port of the second beam splitter in the data submodule using the internal optical interface of the optical interface and electrical interface connector; and the optical/electrical signal modulator in each data submodule is connected to a to-be-output electrical signal interface corresponding to an internal optical interface connected to the second beam splitter, and the optical receiver in each data submodule is connected to a to-be-received electrical signal interface corresponding to an internal optical interface connected to the second beam splitter.

According to a second aspect of the present disclosure, a network device is provided, including a cable clip and the optical transceiver according to any one of the first aspect to the seventh possible implementation of the first aspect; and the optical transceiver is disposed on the cable clip.

According to the optical transceiver and the network device provided in the present disclosure, a common end module includes a multi-carrier light source, a wavelength division multiplexer, a wavelength division demultiplexer, an external optical interface, and at least two first beam splitters. The common end module is used for providing a light source, and only the common end module needs to be managed. In addition, a data submodule includes a second beam splitter, an optical/electrical signal modulator, and an optical receiver. There are at least two data submodules, and a quantity of data submodules may be correspondingly configured according to a capacity required by the optical transceiver, so that a high-capacity optical transceiver with a single optical interface is implemented, and only the single optical interface needs to be managed. This reduces optical interface management complexity, reduces a fiber resource, and resolves an implementation and cost bottleneck of a large-granularity optical transceiver.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Many functions on a communications network need to be implemented using a photoelectric technology in which an optical transceiver is a necessary component. The optical transceiver is an important component in a fiber communications system, is applied to signal transmission between a router and a network device, and mainly implements a conversion between an optical signal and an electrical signal. The optical transceiver may convert an optical signal on a fiber into an electrical signal and transmit the electrical signal to the network device, and the optical transceiver may also convert an electrical signal into an optical signal and transmit the optical signal to the router by means of fiber transmission.

Figure 1:
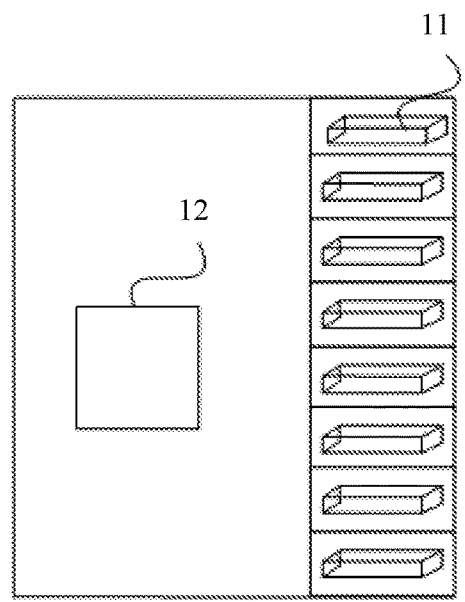
FIG. 1 is a schematic diagram of a system in which small-granularity optical transceivers are multiplexed in parallel in the prior art.

FIG. 1 is a schematic diagram of a system in which small-granularity optical transceivers are multiplexed in parallel in the prior art. As shown in FIG. 1, a structure in which multiple small-granularity optical transceivers 11 are multiplexed in parallel is used to implement high-capacity optical transceiver transmission. The multiple small-granularity optical transceivers 11 are inserted into a cable clip 12 in parallel. Each small-granularity optical transceiver 11 has a light source, and the multiple small-granularity optical transceivers 11 and multiple optical interfaces are multiplexed in parallel to implement a high-capacity optical transceiver. The optical interface is a physical interface for connecting a fiber-optic cable, and is configured to process an optical signal. A quantity of the optical interfaces in the system in which the small-granularity optical transceivers are multiplexed in parallel is equal to a quantity of the small-granularity optical transceivers 11. The quantity of the optical interfaces needs to be equal to the quantity of the small-granularity optical transceivers 11, all the optical interfaces need to be managed, and a quantity of pairs of fiber resources used for interconnection to a peer network device needs to be equal to the quantity of the small-granularity optical transceivers 11. For example, to implement a cable clip of 1 Tbps, 25 optical transceivers of 40 Gbps may be multiplexed in parallel to implement transmission of 1 Tbps. The system in which the small-granularity optical transceivers are multiplexed in parallel has 25 optical interfaces, the 25 optical interfaces need to be managed, and 25 pairs of fiber resources need to be used for interconnection to a peer network device.

Figure 2:
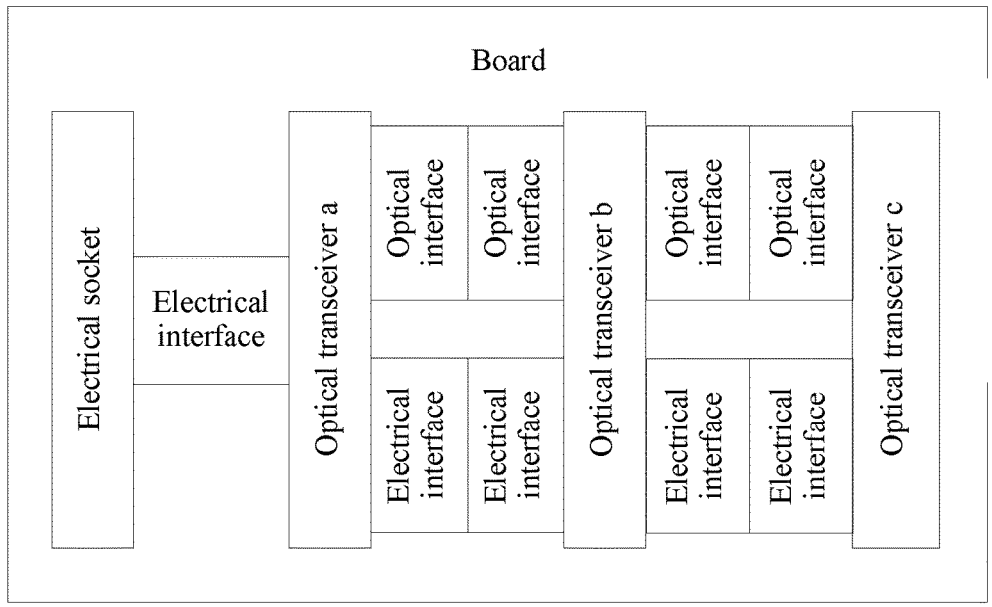
FIG. 2 is a schematic diagram of a system in which small-granularity optical transceivers are serially concatenated in the prior art.

FIG. 2 is a schematic diagram of a system in which small-granularity optical transceivers are serially concatenated in the prior art. As shown in FIG. 2, a structure in which multiple small-granularity optical transceivers are serially concatenated is used for performing modular connection. Each small-granularity optical transceiver has a front-facing optical interface, a rear-facing optical interface, a front-facing electrical interface, and a rear-facing electrical interface. The electrical interface is a physical interface for connecting a common network cable and a radio-frequency coaxial cable, and is configured to process an electrical signal. Small-granularity optical transceivers at different levels are connected using the front-facing optical interface, the rear-facing optical interface, the front-facing electrical interface, and the rear-facing electrical interface, so that optical signals of the transceivers at different levels are multiplexed and electrical signals of the transceivers at different levels are transmitted. Using the structure in which the small-granularity optical transceivers are serially concatenated, all optical signals may be multiplexed at a transmission optical interface, and all electrical signals are transmitted to a board using the electrical interface. FIG. 2 shows the structure in which small-granularity optical transceivers at only three levels are serially concatenated. The small-granularity optical transceivers at three levels are respectively a small-granularity optical transceiver a at a first level, a small-granularity optical transceiver b at a second level, and a small-granularity optical transceiver c at a third level. The small-granularity optical transceiver a at the first level is inserted into an electrical socket using the electrical interface, so that an electrical signal is transmitted to the board using the electrical interface. The small-granularity optical transceiver a at the first level is interconnected, using a rear-facing optical interface and a rear-facing electrical interface, to a front-facing optical interface and a front-facing electrical interface of the small-granularity optical transceiver b at the second level. The small-granularity optical transceiver b at the second level is interconnected, using a rear-facing optical interface and a rear-facing electrical interface, to a front-facing optical interface and a front-facing electrical interface of the small-granularity optical transceiver c at the third level. Quantities of the levels, the optical interfaces, and the electrical interfaces in the system in which the small-granularity optical transceivers are serially concatenated are determined according to a capacity of an optical transceiver and a capacity of each small-granularity optical transceiver. For example, to implement a cable clip of 1 Tbps, 25 optical transceivers of 40 Gbps may be serially concatenated to implement transmission of 1 Tbps. The system in which the small-granularity optical transceivers are serially concatenated has 25 levels, and interconnection alignment needs to be performed on 12 pairs of optical interfaces.

However, the system in FIG. 1 in which the multiple small-granularity optical transceivers are multiplexed in parallel is used for implementing the high-capacity optical transceiver transmission. First, multiple optical interfaces need to be managed and configured, so as to configure association between transmitted data, and consequently, optical interface management complexity is increased. Second, multiple pairs of fiber resources need to be used for interconnection to a peer network device, and consequently, a fiber resource is wasted, and work on fiber management and cable distribution is greatly increased. The system in FIG. 2 in which the small-granularity optical transceivers are serially concatenated is used for implementing the high-capacity optical transceiver transmission. First, the multiple small-granularity optical transceivers need to be serially concatenated, and consequently, an overall transceiver length is increased, an electrical signal loss is increased, and it is difficult to implement a high-rate and high-capacity optical transceiver. Second, multiple front-facing optical interfaces and rear-facing optical interfaces need to be concatenated, and consequently, difficulty in optical interface interconnection alignment and an accuracy requirement on mechanical treatment are increased.

A technical problem that needs to be resolved in the present disclosure is to implement, based on small-granularity optical transceivers, a high-capacity optical transceiver with a single optical interface, and manage the single optical interface, thereby reducing optical interface management complexity and reducing a fiber resource. In addition, an overall optical transceiver length does not need to be changed, and concatenation of multiple optical interfaces does not exist, so that an electrical signal loss is reduced, and difficulty in optical interface interconnection alignment and an accuracy requirement on mechanical treatment are reduced.

A main idea of the present disclosure is dividing an overall system structure of an optical transceiver into two parts: a common end module and a data submodule. The common end module includes a multi-carrier light source, a wavelength division multiplexer, a wavelength division demultiplexer, an external optical interface, and at least two first beam splitters. The common end module is used for providing a light source, only the common end module needs to be managed, and an optical transceiver with a single optical interface can be implemented. In addition, the data submodule includes a second beam splitter, an optical/electrical signal modulator, and an optical receiver. There are at least two data submodules, a quantity of data submodules may be correspondingly configured according to a capacity required by the optical transceiver, and a high-capacity optical transceiver can be implemented, thereby implementing a high-capacity optical transceiver with a single optical interface.

Specific embodiments are used below to describe in detail the technical solutions of the present disclosure. The following several specific embodiments may be combined with each other, and a same or similar concept or process may not be described repeatedly in some embodiments.

Figure 3:
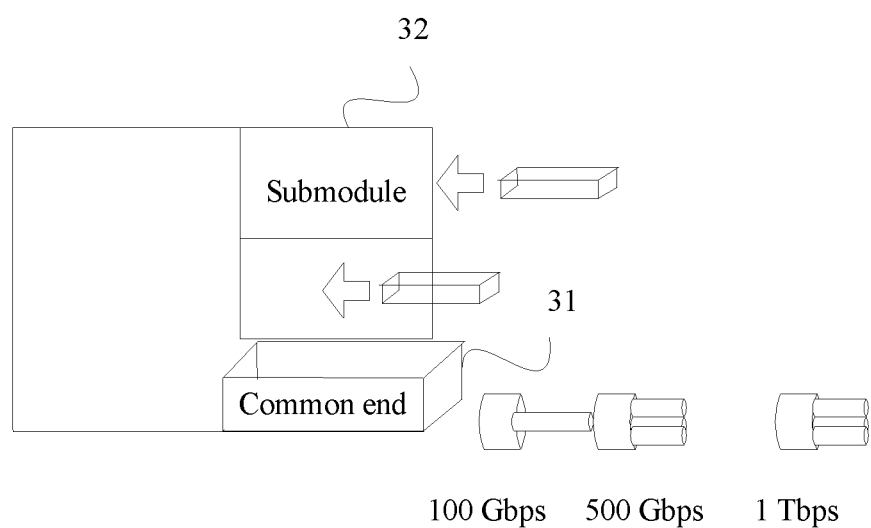
FIG. 3 is a schematic systematic diagram of an optical transceiver according to Embodiment 1 of the present disclosure.
Figure 4:
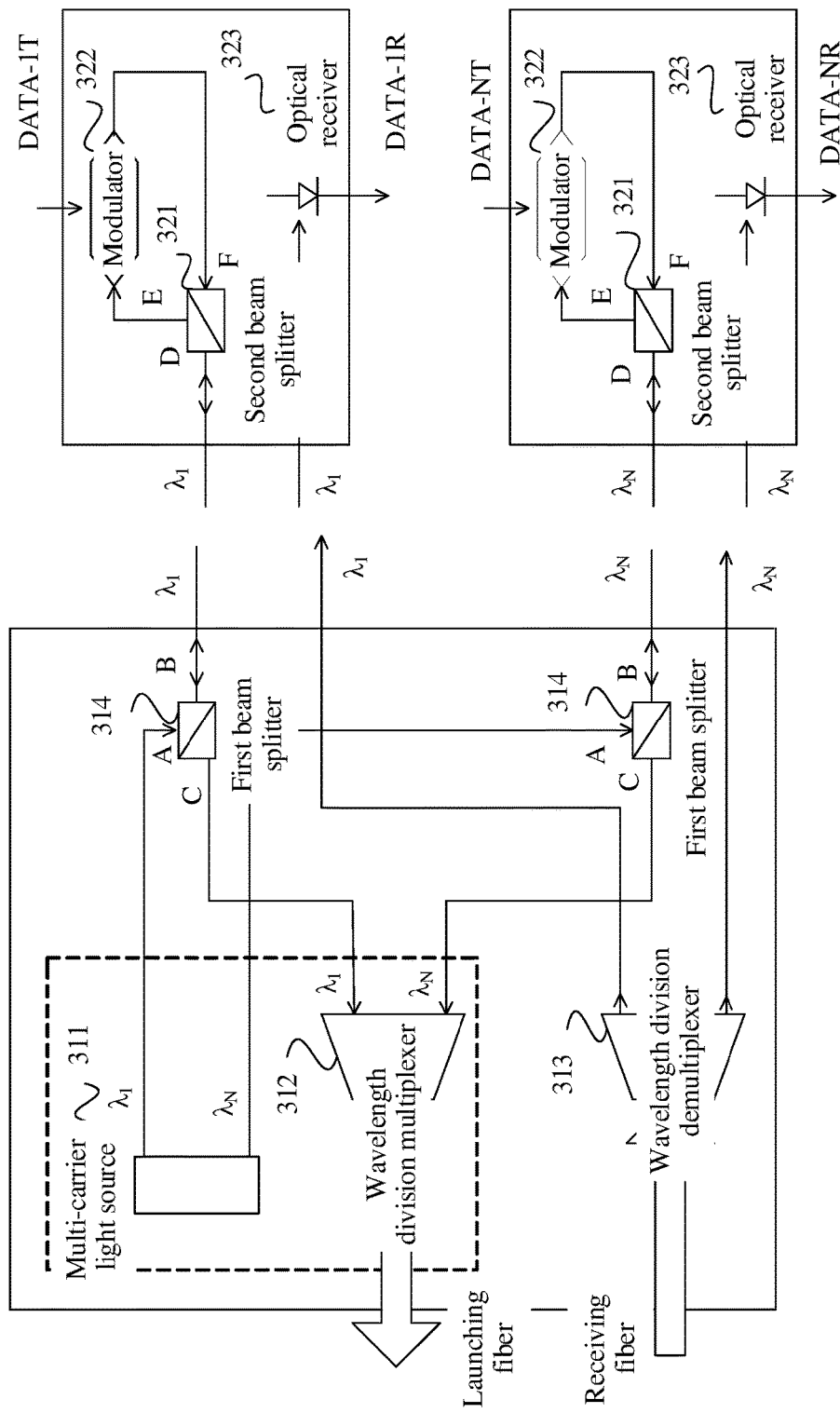
FIG. 4 is a schematic structural diagram of a common end module and a data submodule according to the present disclosure.

FIG. 3 is a schematic systematic diagram of an optical transceiver according to Embodiment 1 of the present disclosure, and FIG. 4 is a schematic structural diagram of a common end module and a data submodule according to the present disclosure. As shown in FIG. 3 and FIG. 4, the optical transceiver in this embodiment includes a common end module 31 and two data submodules 32.

The common end module 31 includes a multi-carrier light source 311, a wavelength division multiplexer 312, a wavelength division demultiplexer 313, an external optical interface (not shown), and two first beam splitters 314.

The data submodule 32 includes a second beam splitter 321, an optical/electrical signal modulator 322, and an optical receiver 323.

The multi-carrier light source 311 is separately connected to first ports of the two first beam splitters 314, the wavelength division multiplexer 312 is separately connected to second ports of the two first beam splitters 314, a third port of each first beam splitter 314 is connected to a first port of the second beam splitter 321 in the data submodule 32, and the wavelength division demultiplexer 313 is connected to the optical receiver 323 in each data submodule 32.

In each data submodule 32, a second port of the second beam splitter 321 is connected to an input port of the optical/electrical signal modulator 322, and a third port of the second beam splitter 321 is connected to an output port of the optical/electrical signal modulator 322.

The multi-carrier light source 311 is configured to generate optical signals of two wavelengths, and each of the optical signals of two wavelengths is input to the second beam splitter 321 in the data submodule 32 using the first beam splitter 314, and the optical/electrical signal modulator 322 is configured to modulate a to-be-output electrical signal and an optical signal in the second beam splitter 321 to to-be-output optical signals, where the to-be-output optical signals are input to the wavelength division multiplexer 312 using the second beam splitter 321, to be combined into a to-be-sent optical signal, and the to-be-sent optical signal is output using the external optical interface.

An optical signal received by the external optical interface is split into two to-be-received optical signals using the wavelength division demultiplexer 313, each to-be-received optical signal is input to the optical receiver 323 in the data submodule 32, and the optical receiver 323 in each data submodule 32 is configured to perform optical/electrical detection on a received to-be-received optical signal, to output a to-be-received electrical signal.

It should be noted that the optical transceiver includes two data submodules 32, but a quantity of data submodules 32 is not limited to two. The common end module 31 includes two first beam splitters 314, but a quantity of first beam splitters 314 is not limited to two.

According to the optical transceiver provided in this embodiment, a common end module 31 includes a multi-carrier light source 311, a wavelength division multiplexer 312, a wavelength division demultiplexer 313, an external optical interface, and two first beam splitters 314. The common end module 31 is used for providing a light source, and only the common end module 31 needs to be managed.

In addition, two data submodules 32 separately include a second beam splitter 321, an optical/electrical signal modulator 322, and an optical receiver 323. A quantity of data submodules 32 may be correspondingly configured according to a capacity required by the optical transceiver, so that a high-capacity optical transceiver with a single optical interface is implemented, and only the single optical interface needs to be managed. This reduces optical interface management complexity, reduces a fiber resource, and resolves an implementation and cost bottleneck of a large-granularity optical transceiver.

Figure 5:
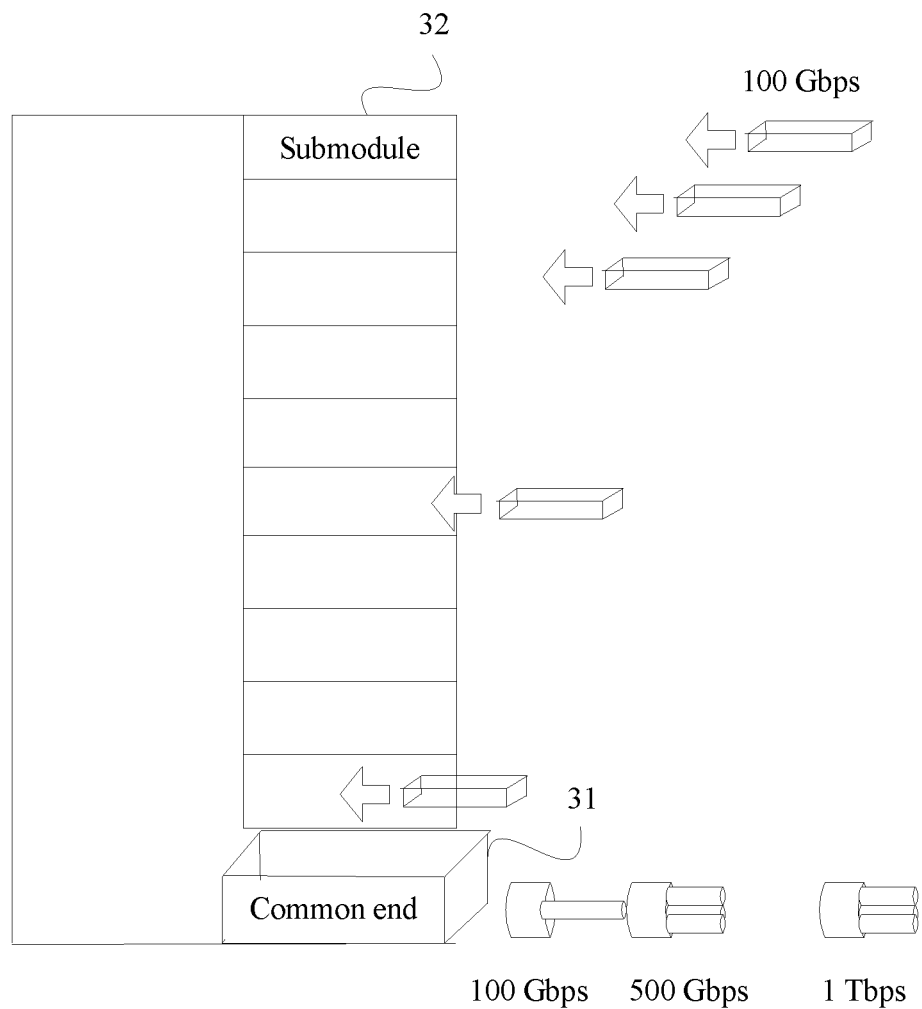
FIG. 5 is a schematic systematic diagram of an optical transceiver according to Embodiment 2 of the present disclosure.

FIG. 5 is a schematic systematic diagram of an optical transceiver according to Embodiment 2 of the present disclosure. As shown in FIG. 5, the optical transceiver in this embodiment includes a common end module 31 and at least two data submodules 32.

It should be noted that for a schematic structural diagram of the common end module 31 and the data submodule 32 in this embodiment, reference may be made to the schematic structural diagram of the common end module 31 and the data submodule 32 in FIG. 4.

The common end module 31 includes a multi-carrier light source 311, a wavelength division multiplexer 312, a wavelength division demultiplexer 313, an external optical interface (not shown), and at least two first beam splitters 314.

The beam splitter is a component for splitting an optical signal, and is configured to split an optical signal. Optical signals of a same wavelength can pass through only a same beam splitter. The first beam splitter 314 is a beam splitter in the common end module 31. The first beam splitter 314 is referred to as the first beam splitter 314 to be distinguished from a second beam splitter 321 in the data submodule 32, but is not limited to being referred to as the first beam splitter 314, and may also be referred to as a common end beam splitter. This is not limited herein in this embodiment. The first beam splitter 314 is configured to split optical signals of multiple wavelengths generated by the multi-carrier light source 311. In addition, the first beam splitter 314 is configured to receive optical signals of a same wavelength sent by the second beam splitter 321. The first beam splitter 314 has three ports: a first port A, a second port C, and a third port B. The first port A is used as a port from which an optical signal goes in, the second port C is used as a port from which an optical signal goes out, and the third port B may be used as both a port from which light goes in and a port from which light goes out. When the first port A is the port from which light goes in, the third port B is used as the port from which light goes out; and when the third port B is used as the port from which light goes in, the second port C is used as the port from which light goes out. For example, if an optical signal goes in from the first port A of the first beam splitter 314, the optical signal can go out only from the third port B of the first beam splitter 314. If an optical signal goes in from the third port B of the first beam splitter 314, the optical signal can go out only from the second port C of the first beam splitter 314.

The multi-carrier light source 311 may provide a direct current light source, and is configured to generate optical signals of at least two wavelengths. A quantity of optical signals of multiple wavelengths generated by the multi-carrier light source 311 is equal to a quantity of the first beam splitters 314. If there are N optical signals of multiple wavelengths generated by the multi-carrier light source 311 and N first beam splitters, wavelengths of the optical signals generated by the multi-carrier light source 311 are marked as $\lambda_1, \lambda_2, \ldots,$ and $\lambda_N$ respectively, where N is a positive integer greater than or equal to a quantity of the data submodules.

The wavelength division multiplexer 312 is configured to combine optical signals of different wavelengths into one optical signal, and the optical signal obtained by means of combination is transmitted along a single fiber. The wavelength division demultiplexer 313 is configured to split one optical signal transmitted along a single fiber into optical signals of multiple wavelengths. Specific operating principles of the wavelength division multiplexer 312 and the wavelength division demultiplexer 313 are the same as operating principles of a wavelength division multiplexer and a wavelength division demultiplexer in the prior art, and details are not described herein in this embodiment.

The data submodule 32 includes a second beam splitter 321, an optical/electrical signal modulator 322, and an optical receiver 323.

The second beam splitter 321 is a beam splitter in the data submodule 32, and one data submodule 32 has one second beam splitter 321. The second beam splitter 321 is referred to as the second beam splitter 321 to be distinguished from the first beam splitter 314 in the common end module 31, but is not limited to being referred to as the second beam splitter 321, and may also be referred to as a data submodule beam splitter. This is not limited herein in this embodiment. The second beam splitter 321 is configured to split an optical signal obtained by modulation by the optical/electrical signal modulator 322. In addition, the second beam splitter 321 is configured to receive optical signals of a same wavelength sent by the first beam splitter 314. The second beam splitter 321 has three ports: a first port D, a second port E, and a third port F. The first port D may be used as both a port from which light goes in and a port from which light goes out, the second port E is used as a port from which light goes out, and the third port F is used as a port from which light goes in. When the first port D is the port from which light goes in, the second port E is used as the port from which light goes out; and when the third port F is used as the port from which light goes in, the first port D is used as the port from which light goes out. For example, if an optical signal goes in from the first port D of the second beam splitter 321, the optical signal can go out only from the second port E of the second beam splitter 321. If an optical signal goes in from the third port F of the second beam splitter 321, the optical signal can go out only from the first port D of the second beam splitter 321.

It should be noted that a beam splitter can receive only optical signals of a same wavelength. One first beam splitter 314 is corresponding to one data submodule 32, and a second beam splitter 321 in the data submodule 32 corresponding to the first beam splitter 314 is corresponding to the first beam splitter 314. For example, if an optical signal whose wavelength is $\lambda_1$ passes through the first beam splitter 314, only an optical signal whose wavelength is $\lambda_1$ can pass through the second beam splitter 312 in the data submodule 32 corresponding to a wavelength $\lambda_1$. If an optical signal whose wavelength is $\lambda_N$ passes through the first beam splitter 314, only an optical signal whose wavelength is $\lambda_N$ can pass through the second beam splitter 312 in the data submodule 32 corresponding to a wavelength $\lambda_N$.

The optical/electrical signal modulator 322 is configured to modulate a to-be-output electrical signal and an optical signal in the second beam splitter 321 to to-be-output optical signals. The optical receiver 323 is configured to perform optical/electrical detection on a received optical signal. Specific operating principles of the optical/electrical signal modulator 322 and the optical receiver 323 are the same as operating principles of an optical/electrical signal modulator and an optical receiver in the prior art, and details are not described herein in this embodiment.

The quantity of the first beam splitters 314 is greater than or equal to the quantity of the data submodules 32.

It should be noted that the quantity of the first beam splitters 314 is greater than or equal to the quantity of the data submodules 32, and each data submodule 32 has a corresponding first beam splitter 314, so as to ensure that an optical signal passing through each first beam splitter 314 can be transmitted to each corresponding data submodule 32.

The multi-carrier light source 311 is separately connected to first ports of the at least two first beam splitters 314, the wavelength division multiplexer 312 is separately connected to second ports of the at least two first beam splitters 314, a third port of each first beam splitter 314 is connected to a first port of the second beam splitter 321 in the data submodule 32, and the wavelength division demultiplexer 313 is connected to the optical receiver 323 in each data submodule 32.

In each data submodule 32, a second port of the second beam splitter 321 is connected to an input port of the optical/electrical signal modulator 322, and a third port of the second beam splitter 321 is connected to an output port of the optical/electrical signal modulator 322.

The multi-carrier light source 311 is configured to generate optical signals of at least two wavelengths, and each of the optical signals of at least two wavelengths is input to the second beam splitter 321 in the data submodule 32 using the first beam splitter 314, and the optical/electrical signal modulator 322 is configured to modulate a to-be-output electrical signal and an optical signal in the second beam splitter 321 to to-be-output optical signals, where the to-be-output optical signals are input to the wavelength division multiplexer 312 using the second beam splitter 321, to be combined into a to-be-sent optical signal, and the to-be-sent optical signal is output using the external optical interface.

An optical signal received by the external optical interface is split into at least two to-be-received optical signals using the wavelength division demultiplexer 313, each to-be-received optical signal is input to the optical receiver 323 in the data submodule 32, and the optical receiver 323 in each data submodule 32 is configured to perform optical/electrical detection on a received to-be-received optical signal, to output a to-be-received electrical signal.

Each of the optical signals of at least two wavelengths generated by the multi-carrier light source 311 is input to the second beam splitter 321 in the data submodule 32 using the first beam splitter 314, and the to-be-output optical signals obtained by modulation by the optical/electrical signal modulator 322 are input to the wavelength division multiplexer 312 using the second beam splitter 321, to be combined into the to-be-sent optical signal, and the to-be-sent optical signal is output using the external optical interface.

In specific use, when the optical transceiver is used as a transmit end, the multi-carrier light source 311 generates optical signals of multiple wavelengths. The optical signals of multiple wavelengths separately enter the first beam splitters 314, and optical signals of a same wavelength enter a same first beam splitter 314. Optical signals of a same wavelength enter in a slow axis (or a fast axis) from the first port A of the first beam splitter 314. The slow axis and the fast axis are two polarization directions of an optical signal, the slow axis is a direction in parallel with the optical signal, and the fast axis is a direction perpendicular to the optical signal. The optical signals of a same wavelength emerge in the slow axis (or the fast axis) from the third port B of the first beam splitter 314. The optical signals emerging in the slow axis (or the fast axis) from the third port B of the first beam splitter 314 are transmitted to the first port D of the second beam splitter 321, enter in the slow axis (or the fast axis) from the first port D of the second beam splitter 321, emerge in the slow axis (or the fast axis) from the second port E of the second beam splitter 321, and are modulated by the optical/electrical signal modulator 322. Optical signals obtained by modulation enter in the slow axis (or the fast axis) from the third port F of the second beam splitter 321, and emerge in the fast axis (or the slow axis) from the first port D of the second beam splitter. Modulated light emerging in the fast axis (or the slow axis) from the first port D of the second beam splitter 321 is transmitted to the third port B of the first beam splitter 314, enters in the fast axis (or the slow axis) from the third port B of the first beam splitter 314, and emerges in the slow axis (or the fast axis) from the second port C of the first beam splitter 314. Emergent light of the second port C of each first beam splitter 314 is transmitted to a launching fiber after being multiplexed by the wavelength division multiplexer 312.

When the optical transceiver is used as a receive end, optical signals of multiple wavelengths received from a receiving fiber are demultiplexed by the wavelength division demultiplexer 313, and then are transmitted to the data submodules 32 using different fibers. Each data submodule 32 performs, using the optical receiver 323, optical/electrical detection on a received optical signal of a corresponding wavelength, so that an electrical signal is recovered.

It should be noted that the multi-carrier light source 311 in the common end module 31 generates optical signals of multiple wavelengths, and provides a direct current light source for each data submodule 32. An optical signal of each wavelength generated by the multi-carrier light source 311 is corresponding to one first beam splitter 314, and each first beam splitter 314 is corresponding to one second beam splitter 321, so that optical signals of all wavelengths generated by the multi-carrier light source 311 may be transmitted to the data submodule 32. In this way, the data submodule 32 is colorless, so that the optical transceiver may perform unified coding and may be miniaturized and eco-friendly with low power consumption. That the data submodule 32 is colorless means that optical signals of all wavelengths can pass through the data submodule 32. Each data submodule 32 has a data transmit end and a data receive end. As shown in FIG. 4, DATA-1T indicates a data transmit end of a data submodule 32 that receives an optical signal whose wavelength is $\lambda_1$, DATA-1R indicates a data receive end of the data submodule 32 that receives an optical signal whose wavelength is $\lambda_1$, DATA-NT indicates a data transmit end of a data submodule 32 that receives an optical signal whose wavelength is $\lambda_N$, and DATA-NR indicates a data receive end of the data submodule 32 that receives an optical signal whose wavelength is $\lambda_N$.

According to the optical transceiver provided in this embodiment, a common end module 31 includes a multi-carrier light source 311, a wavelength division multiplexer 312, a wavelength division demultiplexer 313, an external optical interface, and at least two first beam splitters 314. The common end module 31 is used for providing a light source, and only the common end module 31 needs to be managed. In addition, a data submodule 32 includes a second beam splitter 321, an optical/electrical signal modulator 322, and an optical receiver 323. There are at least two data submodules 32, and a quantity of data submodules 32 may be correspondingly configured according to a capacity required by the optical transceiver, so that a high-capacity optical transceiver with a single optical interface is implemented, and only the single optical interface needs to be managed. This reduces optical interface management complexity, reduces a fiber resource, and resolves an implementation and cost bottleneck of a large-granularity optical transceiver.

Further, in the embodiment shown in FIG. 3, the first beam splitter 314 and the second beam splitter 321 are polarization beam splitters (PBS), the multi-carrier light source 311 is configured to generate linearly polarized light of at least two wavelengths, and the first beam splitter 314 and the second beam splitter 321 are connected using a polarization maintaining optical fiber.

The polarization beam splitter may separate light in two different vibration directions, and the polarization beam splitter splits one beam of light in two polarization directions into two beams of linearly polarized light using a birefringent crystal. For example, the first beam splitter 314 is a polarization beam splitter. Linearly polarized light that is generated by the multi-carrier light source 311 and whose wavelength is $\lambda_1$ has an optical signal in two polarization directions: a latitudinal direction and a longitudinal direction, and the optical signal goes in the first beam splitter through the first port A of the first beam splitter 314. The first beam splitter splits the optical signal whose wavelength is $\lambda_1$ in the two polarization directions: the latitudinal direction and the longitudinal direction into two optical signals whose wavelengths are $\lambda_1$. One is polarized light in the latitudinal direction and the other is polarized light in the longitudinal direction, and the two optical signals that are obtained by means of splitting and whose wavelengths are $\lambda_1$ but polarization directions are different are output using the third port B of the first beam splitter 314. Likewise, the second beam splitter 321 is a polarization beam splitter. Modulated light that is obtained by modulation by the optical/electrical signal modulator 322 and whose wavelength is $\lambda_1$ has an optical signal in two polarization directions: a latitudinal direction and a longitudinal direction, and the optical signal goes in the second beam splitter 321 through the third port F of the second beam splitter 321. The second beam splitter 321 splits the optical signal whose wavelength is $\lambda_1$ in the two polarization directions: the latitudinal direction and the longitudinal direction into two optical signals whose wavelengths are $\lambda_1$. One is polarized light in the latitudinal direction and the other is polarized light in the longitudinal direction, and the two optical signals that are obtained by means of splitting and whose wavelengths are $\lambda_1$ but polarization directions are different are output using the first port D of the second beam splitter 321.

It should be noted that the linearly polarized light is polarized light whose light vibration (in a plane perpendicular to an optical wave forwarding direction) is limited to a fixed direction. The first beam splitter 314 and the second beam splitter 321 are connected using a polarization maintaining optical fiber, to ensure that a polarization direction of the linearly polarized light is not changed in a process of transmission between the first beam splitter 314 and the second beam splitter 321.

Further, in the embodiment shown in FIG. 3, the polarization beam splitter is a bidirectional multiplex polarization beam splitter.

The first beam splitter 314 is a bidirectional multiplex polarization beam splitter. Linearly polarized light generated by the multi-carrier light source 311 may emerge in a slow axis (or a fast axis) from the third port B of the first beam splitter 314, and linearly polarized light obtained by modulation by the optical/electrical signal modulator 322 may enter in the fast axis (or the slow axis) from the third port B of the first beam splitter 314. The second beam splitter 321 is a bidirectional multiplex polarization beam splitter. Linearly polarized light generated by the multi-carrier light source 311 may enter in a slow axis (or a fast axis) from the first port D of the second beam splitter 321, and linearly polarized light obtained by modulation by the optical/electrical signal modulator 322 may emerge in the fast axis (or the slow axis) from the first port D of the second beam splitter 321. The linearly polarized light generated by the multi-carrier light source 311 emerges in the slow axis (or the fast axis) from the third port B of the first beam splitter 314, and the linearly polarized light obtained by modulation by the optical/electrical signal modulator 322 emerges in the fast axis (or the slow axis) from the first port D of the second beam splitter 321, so that different optical waves are transmitted in two directions on the common end module 31 and the data submodule 32, thereby implementing multiplexing functions of the common end module 31 and the data submodule 32.

Further, in the embodiment shown in FIG. 4, the optical/electrical signal modulator 322 includes a Mach-Zehnder modulator 322 (MZ) or an Electro-Absorption Modulator (EAM).

The optical/electrical signal modulator 322 may be the Mach-Zehnder modulator or the electro-absorption modulator. An operating principle of the Mach-Zehnder modulator or the electro-absorption modulator is the same as an operating principle of a Mach-Zehnder modulator or an electro-absorption modulator in the prior art, and details are not described herein.

Further, in the embodiment shown in FIG. 4, the external optical interface is a single optical interface.

The external optical interface and a router optical interface are interconnected, the external optical interface is the single optical interface, a router needs to manage and configure only the external optical interface that is the single optical interface, so that optical interface management complexity is reduced.

Further, in the embodiment shown in FIG. 4, the optical transceiver further includes an internal optical interface, and the internal optical interface is multiple optical interfaces.

The third port of each first beam splitter 314 is connected to the first port of the second beam splitter 321 in the data submodule 32 using the internal optical interface.

The internal optical interface and the data submodule 32 are optically interconnected. The internal optical interface is configured to send an optical signal provided by the multi-carrier light source 311 in the common end module 31 to the optical/electrical signal modulator 322 in each data submodule 32, for modulating and transmitting, and receive an optical signal obtained by demultiplexing by the wavelength division demultiplexer 313 in the common end module 31. The internal optical interface is the multiple optical interfaces, so as to ensure that an optical signal of each wavelength provided by the common end module 31 is sent to each corresponding data submodule 32.

Figure 6:
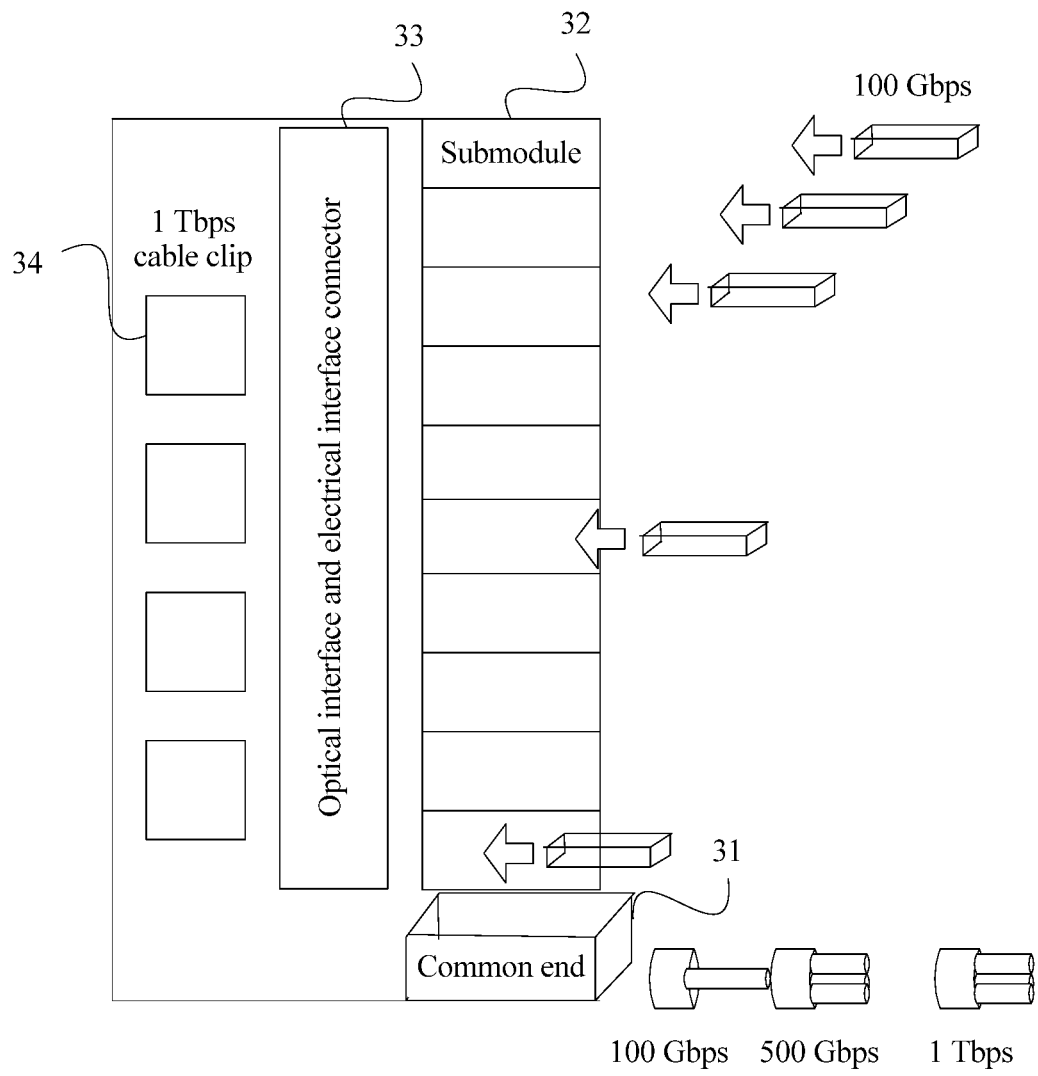
FIG. 6 is a schematic systematic diagram of an optical transceiver according to Embodiment 3 of the present disclosure.

FIG. 6 is a schematic systematic diagram of an optical transceiver according to Embodiment 3 of the present disclosure. As shown in FIG. 6, FIG. 6 is based on the embodiments shown in FIG. 3 to FIG. 5. Further, the optical transceiver further includes an optical interface and electrical interface connector 33. The optical interface and electrical interface connector 33 includes at least two internal optical interfaces, a quantity of internal optical interfaces inside the optical interface and electrical interface connector 33 is equal to a quantity of the first beam splitters 314, and each internal optical interface of the optical interface and electrical interface connector 33 has a corresponding to-be-output electrical signal interface and a corresponding to-be-received electrical signal interface.

The third port of each first beam splitter 314 is connected to the first port of the second beam splitter 321 in the data submodule 32 using the internal optical interface of the optical interface and electrical interface connector 33.

The optical/electrical signal modulator 322 in each data submodule 32 is connected to a to-be-output electrical signal interface corresponding to an internal optical interface connected to the second beam splitter 321, and the optical receiver 323 in each data submodule 32 is connected to a to-be-received electrical signal interface corresponding to an internal optical interface connected to the second beam splitter 321.

The optical interface and electrical interface connector 33 is disposed on a cable clip 34, and each data submodule 32 is connected to the cable clip 34 using the optical interface and electrical interface connector 33. A corresponding quantity of data submodules 32 may be configured according to a capacity required by the cable clip 34.

It should be noted that in this embodiment, all optical interfaces and electrical interfaces in the optical interface and electrical interface connector 33 are faced with an inside of the cable clip 34. Data exchange is performed between the electrical interfaces and the cable clip 34, and the optical interface and electrical interface connector 33 includes at least two internal optical interfaces, so that the data submodule 32 may be configured according to a requirement, and a small-granularity data submodule 32 may be replaced freely.

For example, the optical interface and electrical interface connector 33 includes 30 internal optical interfaces, and if an optical transceiver with a capacity of 1 Tbps needs to be configured, 25 data submodules 32 of 40 Gbps may be inserted, or 10 data submodules 32 of 100 Gbps may be inserted. A specific quantity of inserted data submodules 32 and a capacity of the inserted data submodule 32 are determined according to an internal optical interface inside an optical interface and electrical interface connector 33 of an actually used optical transceiver, and this is not limited herein in this embodiment.

According to the optical transceiver provided in this embodiment, based on the foregoing embodiments, an optical interface and electrical interface connector 33 is disposed, and the optical interface and electrical interface connector 33 includes at least two internal optical interfaces, so that a data submodule 32 may be configured according to a requirement, thereby implementing a high-capacity optical transceiver that has a single optical interface and whose capacity may be configured according to requirement. In addition, a small-granularity data submodule 32 may be replaced freely.

A network device provided in an embodiment includes a cable clip 34 and the optical transceiver according to any embodiment of the foregoing embodiments.

The optical transceiver is disposed on the cable clip 34.

The cable clip 34 is a device interface between an access line and an access device of a switch, a router, or another network device. A capacity of the cable clip 34 determines a capacity of the network device. The optical transceiver is disposed on the cable clip 34, and a corresponding quantity of data submodules 32 may be configured according to a capacity required by the cable clip 34, so as to implement a high-capacity optical transceiver, thereby implementing a high-capacity network device.

It should be noted that for a specific structure and function of the optical transceiver in this embodiment, reference may be made to the related content revealed in the embodiments about the foregoing optical transceivers, and details are not described herein again.

According to the network device provided in this embodiment, an optical transceiver is disposed on a cable clip 34. A common end module 31 of the optical transceiver includes a multi-carrier light source 311, a wavelength division multiplexer 312, a wavelength division demultiplexer 313, an external optical interface, and at least two first beam splitters 314. The common end module 31 is used for providing a light source, and only the common end module 31 needs to be managed. In addition, a data submodule 32 includes a second beam splitter 321, an optical/electrical signal modulator 322, and an optical receiver 323. There are at least two data submodules 32, a quantity of data submodules 32 may be correspondingly configured according to a capacity required by the optical transceiver, so as to implement a high-capacity optical transceiver with a single optical interface, thereby implementing a high-capacity network device. In addition, only the single optical interface needs to be managed, optical interface management complexity of the optical transceiver is reduced, a fiber resource is reduced, and an implementation and cost bottleneck of a large-granularity optical transceiver is resolved.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An optical transceiver, comprising:
    a common end module comprising:
        a plurality of first beam splitters, each comprising a first port and a second port;
        a multi-carrier light source configured to generate a plurality of optical signals, the multi-carrier light source separately coupled to each of the first ports of the plurality of first beam splitters;
        a wavelength division multiplexer separately coupled to each of the second ports of the plurality of first beam splitters;
        a wavelength division demultiplexer; and
        an optical interface configured to split a first optical signal to produce a plurality of second optical signals via the wavelength division demultiplexer; and
    a plurality of data submodules coupled to the wavelength division demultiplexer, the plurality of data submodules corresponding to a data capacity of the optical transceiver, the plurality of data submodules serviceable by the common end module, each of the plurality of data submodules comprising:
        a second beam splitter coupled to one of the plurality of first beam splitters and configured to receive each of the plurality of optical signals from the each of the plurality of first beam splitters;
        an optical/electrical signal modulator comprising an input port and an output port, the input port and the output port being coupled to the second beam splitter, the optical/electrical signal modulator configured to modulate a to-be-output electrical signal and an optical signal of the second beam splitter to produce a to-be-output optical signal and send to the wavelength division multiplexer via the one of the plurality of first beam splitters, then output using the optical interface; and
        an optical receiver configured to perform optical/electrical detection on one of the plurality of optical signals from the optical interface via the wavelength division demultiplexer.

2. The optical transceiver of claim 1, wherein a quantity of the plurality of first beam splitters is greater than or equal to a quantity of the plurality of data submodules, the multi-carrier light source is configured to generate the plurality of optical signals of at least two wavelengths, the each of the plurality of optical signals is input to the second beam splitter in each of the plurality of data submodules, the optical/electrical signal modulator is configured to modulate the to-be-output electrical signal and an optical signal in the second beam splitter to the to-be-output optical signals, the to-be-output optical signal is input to the wavelength division multiplexer using the second beam splitter to produce a to-be-sent optical signal, the to-be-sent optical signal is output using the optical interface, each of the plurality of second optical signals received by the optical interface is split into at least two to-be-received optical signals using the wavelength division demultiplexer, the each of the plurality of second optical signals is input to the optical receiver of a respective data submodule, and the optical receiver of the each of the plurality of data submodules is configured to perform optical/electrical detection on the each of the plurality of optical signals, to output a to-be-received electrical signal.

3. The optical transceiver of claim 2, wherein the each of the plurality of the first beam splitters and the second beam splitter are polarization beam splitters, the multi-carrier light source is configured to generate linearly polarized light of at least two wavelengths, and each of the plurality of the first beam splitters and the second beam splitter are coupled to a polarization maintaining optical fiber.

4. The optical transceiver of claim 3, wherein the polarization beam splitters are bidirectional multiplex polarization beam splitters.

5. The optical transceiver of claim 1, wherein the optical/electrical signal modulator comprises a Mach-Zehnder modulator or an electro-absorption modulator.

6. The optical transceiver of claim 1, wherein the optical interface is a single optical interface.

7. The optical transceiver of claim 1, further comprising an internal optical interface comprising a plurality of optical interfaces, and a third port of the each of the plurality of first beam splitters coupled to a first port of the second beam splitter by the internal optical interface.

8. The optical transceiver of claim 1, further comprising an optical interface and electrical interface connector comprising a plurality of internal optical interfaces corresponding to the plurality of first beam splitters, each of the plurality of internal optical interfaces comprising: a corresponding to-be-output electrical signal interface and a corresponding to-be-received electrical signal interface, a third port of the each of the plurality of first beam splitters coupled to a first port of the second beam splitter in the data submodule by the internal optical interface, the optical/electrical signal modulator of the each of the plurality of data submodules coupled to the to-be-output electrical signal interface corresponding to the internal optical interface coupled to the second beam splitter, and the optical receiver in each data submodule coupled to the to-be-received electrical signal interface corresponding to the internal optical interface coupled to the second beam splitter.

9. The optical transceiver of claim 1, wherein the optical transceiver is disposed on a cable clip.

10. A network device, comprising:
a cable clip; and
an optical transceiver disposed on the cable clip, the optical transceiver comprising:
   a common end module comprising:
      a plurality of first beam splitters, each comprising a first port and a second port;
      a multi-carrier light source configured to generate a plurality of optical signals, the multi-carrier light source separately coupled to each of the first ports;
      a wavelength division multiplexer separately coupled to each of the second ports of the plurality of first beam splitters;
      a wavelength division demultiplexer; and
      an optical interface to produce a plurality of second optical signals via the wavelength division demultiplexer; and
   a plurality of data submodules coupled to the wavelength division demultiplexer, the plurality of data submodules corresponding to a data capacity of the optical transceiver, the plurality of data submodules serviceable by the common end module, wherein each of the plurality of data submodules comprising:
      a second beam splitter coupled to one of the plurality of first beam splitters and configured to receive each of the plurality of optical signals from the each of the plurality of first beam splitters;
      an optical/electrical signal modulator, an input port and the output port of the optical/electrical signal modulator being coupled to the second beam splitter, the optical/electrical signal modulator configured to modulate a to-be-output electrical signal and an optical signal of the second beam splitter to produce a to-be-output optical signal and send to the wavelength division multiplexer via the one of the plurality of first beam splitters, then output using the optical interface; and
      an optical receiver configured to perform optical/electrical detection on one of the plurality of plurality of optical signals from the optical interface via the wavelength division demultiplexer.

11. A method of an optical transceiver comprising:
generating, by a multi-carrier light source of a common end module, a plurality of optical signals, the multi-carrier light source separately coupled to respective first ports of a plurality of first beam splitters of the common end module;
splitting, by an optical interface of the common end module, a received optical signal into a plurality of second optical signals using a wavelength division demultiplexer of the common end module;
receiving, by a second beam splitter of each of a plurality of data submodules corresponding to a data capacity of the optical transceiver that are serviceable by the common end module, one of the plurality of optical signals via one of the plurality of first beam splitters, wherein a first port of the second beam splitter is coupled to a third port of the one of the plurality of first beam splitters;
modulating, by an optical/electrical signal modulator of each of the plurality of data submodules, a to-be-output electrical signal and an optical signal in the second beam splitter to to-be-output optical signals;
inputting, by the second beam splitter, the to-be-output optical signal to a wavelength division multiplexer via the one of the plurality of first signal splitters to produce a to-be-sent optical signal;
outputting, by the optical interface, the to-be-sent optical signal; and
performing, by an optical receiver of the each of the plurality of data submodules, optical/electrical detection on one of the plurality of second optical signals from the optical interface to output a to-be-received electrical signal.

12. The method of claim 11, wherein a quantity of the plurality of first beam splitters is greater than or equal to a quantity of the plurality of data submodules.

13. The method of claim 12, wherein the each of the plurality of the first beam splitters and the second beam splitter are polarization beam splitters, the multi-carrier light source is configured to generate linearly polarized light of at least two wavelengths, and the one of the plurality of the first beam splitters and the second beam splitter are coupled to a polarization maintaining optical fiber.

14. The method of claim 13, wherein the polarization beam splitters are bidirectional multiplex polarization beam splitters.

* * * * *